Patented July 18, 1950

2,515,960

UNITED STATES PATENT OFFICE 2,515,960

METHOD OF PRODUCING SILICA SOLS

Morris D. Marshall, Arlington, Mass., assignor to Monsanto Chemical Company, St. Louis, Mo., a corporation of Delaware No Drawing. Application September 29, 1947, Serial No. 776,857

13 Claims. (Cl. 252—313)

The present invention relates to improved methods of preparing stable, alkaline reacting aquasols containing high concentrations of an inorganic oxide as the discontinuous phase.

One object of the present invention is to provide improved methods of preparing stable and highly concentrated aquasols from organo-aquasols.

A further object of the present invention is to prepare very stable and highly concentrated aquasols from organo-aquasols by a facile and efficient method.

Still further objects and advantages of the present invention will appear from the following description and the appended claims.

The invention is in general carried out by first forming an acid reacting organo-aquasol having a pH of from 2.0 to 4.0 and containing an inorganic oxide, admixing a suitable quantity of such acid reacting sol and a dilute alkaline solution, removing substantially all organic diluent from the alkaline reacting organo-aquasol so formed, and adding further portions of such acid reacting sol, and water if required, in a plurality of successive addition steps to the resulting colloidal solution so as to maintain an alkaline reacting colloidal solution and removing substantially all organic diluent from such colloidal solution between each of the addition steps and after the final addition step. If desired, the resulting aquasol may be further concentrated by removing an appropriate quantity of water by any suitable method such as evaporation, distillation or the like.

Such method yields very stable and highly concentrated aquasols which are stable for periods up to 12 months or longer and which contain up to 25% or more inorganic oxide.

As examples of dilute alkaline solutions which may be used in accordance with the above method are aqueous solutions comprising one or more of such alkaline compounds as NaOH, LiOH, KOH, CsOH, quaternary ammonium bases and the like. Dilute alkaline solutions comprising NaOH or KOH or both are particularly preferred.

Acid reacting organo-aquasols having a pH of from 2.0 to 4.0 and containing an inorganic oxide for use in accordance with the present invention may be prepared in any suitable manner. In the case of silica sols, for example, they are preferably prepared by reacting an aqueous alkali silicate such as sodium silicate and an inorganic acid as, for example, sulfuric acid in suitable proportions to provide a pH between 2.0 and 4.0. Any other suitable method may be employed, however, depending upon the particular inorganic oxide sol which it is desired to prepare. The resulting initial aquasols, which contain an inorganic oxide and a dissolved inorganic salt, are then treated with a water-miscible organic diluent as, for example, ethanol to precipitate the inorganic salt which is removed from the resulting acid reacting organo-aquasol by any suitable method as, for example, by centrifuging, filtration, decantation and the like. Such methods are described more fully in U. S. patent to Morris D. Marshall number 2,285,449. In precipitating the dissolved inorganic salt less organic diluent may be used and the solution cooled prior to and after such addition as described more fully in U. S. patent to John F. White number 2,285,477. Preferred acid reacting sols prepared by such methods for use in accordance with the present invention are acid reacting ethanol-aquasols, acetone-aquasols, 2-propanol-aquasols, and 2-methyl-2-propanol-aquasols.

In a preferred embodiment of the invention, a suitable quantity of an acid reacting organo-aquasol having a pH of from 2.0 to 4.0 and preferably containing up to 10% of an inorganic oxide is prepared as given above, and a portion thereof, preferably a minor portion, is admixed with a dilute alkaline aqueous solution preferably comprising from 0.02 mol to 0.15 mol of an alkaline compound or mixture of alkaline compounds of the type hereinbefore described, per liter of aqueous solution so as to form a colloidal solution having a pH above 9.0 and preferably between 9.0 and 10.0. The water-miscible organic diluent contained in such colloidal solution is then substantially all removed in any suitable manner as, for example, by distillation, by extraction with other organic solvents or the like. To the alkaline reacting colloidal solution so obtained is added a plurality of additional portions and preferably from 2 to 7 additional portions of the acid reacting organo-aquasol employed in the initial step as described above. After each of such additions, substantially all organic diluent is removed in any suitable manner as hereinbefore described. The above process gives aquasols which are stable at high concentrations.

As stated above, in the initial admixture of acid reacting organo-aquasol and alkaline solution care should be taken that the pH of the mix is above 9.0. Likewise when making subsequent additions of acid reacting organo-aquasol to such mix care should be taken to prevent the pH of the mix from falling below 8.0 as in either instance stability of the final product will be detrimentally affected if such precautions are not observed.

In making the subsequent additions of organo-aquasol to the alkaline solution it is desirable to add the organo-aquasol in from 2 to 7 portions, usually in approximately equal amounts, in order to avoid the addition of too much organo-aquasol to the alkaline solution at any one time. It is also usually desirable to add suitable quantities of water along with the further additions of organo-aquasol to avoid an unstable mix or final product. However, if the acid reacting organo-aquasol employed contains less than about 25% of organic diluent, such additions are not required. When water is added, it is usually added in amounts between 20 and 50% by weight of the amount of organo-aquasol added.

The removal of organic diluent from the initial mix and after further additions of organo-aquasol, may be carried out either by distillation, by extraction with a suitable organic solvent or by any other suitable method depending upon the nature and characteristics of the organic material being removed. In the event that the organic diluent is removed by distillation, it is preferable to cool the distilland immediately after the completion of the distillation, preferably down to 30° C. or lower.

In carrying out the admixture of dilute alkaline solution and acid reacting organo-aquasol in the initial step as hereinbefore described, it is generally desirable to employ vigorous agitation so as to obtain a colloidal solution in which the pH values are substantially uniform throughout. Moreover, it is preferable in the initial admixing step to add the acid reacting sol to the alkaline solution although this is not essential especially when vigorous agitation is employed during the mixing operation.

A further understanding of the invention will be obtained from the following examples, which are intended to be illustrative, but not limitative of the invention, parts and percentages being by weight unless otherwise specified.

*Example I*

An acid reacting organo-aquasol is prepared in the following manner:

Three hundred and eighty-seven parts of commercial sodium silicate containing 28.4% $SiO_2$ and 9.0% $Na_2O$ are diluted with 160.5 parts of water. This mixture is added with vigorous agitation to 164 parts of an aqueous solution comprising 34% sulfuric acid. The temperature of this mixture is maintained at 10° C. during and after the acid addition. Seven hundred and forty-seven parts of 190 proof ethanol are added to the above mixture which is maintained at a temperature of 10° C. prior to and during the addition of ethanol. The ethanol addition and cooling causes the precipitation of sodium sulfate crystals which are removed by filtration. The resulting acid reacting ethanol-aquasol has a pH of about 2.0, and contains approximately 8.6% $SiO_2$, 0.5% $H_2SO_4$ and .01% $Na_2SO_4$.

A very stable and highly concentrated aquasol is prepared from the above acid reacting organosol in the following manner:

Five hundred and thirty-four parts of ethanol-aquasol as prepared above are added rapidly with stirring to 643 parts of an alkaline solution comprising 0.1 mol of NaOH per liter of water. This mixture is transferred to a still equipped with a stirrer, condenser and cooling means and is heated until 534 parts of an ethanol-water constant boiling mixture are stripped off by distillation. This effects a removal of substantially all of the ethanol and the colloidal solution so formed comprises about 7% $SiO_2$ and about 0.076 mol of NaOH per mol of silica. The colloidal solution is then cooled immediately to about 25° C. by running cold water through the cooling means.

Two hundred and ten parts of acid reacting ethanol-aquasol as prepared by the method given above and 105 parts of water are next added to the colloidal solution in the still. Two hundred and ninety-four parts of ethanol and water (C. B. M.) are stripped off by distillation as described above. The colloidal solution so formed comprises about 10% $SiO_2$ and about 0.051 mol of NaOH per mol of $SiO_2$. The solution is cooled to about 25° C. immediately after the distillation step.

Two hundred and ten parts of acid reacting ethanol-aquasol as prepared by the method as given above and 105 parts of water are then added to the colloidal solution in the still and 332 parts of ethanol and water (C. B. M.) stripped off by distillation after the addition is completed. The colloidal solution so formed comprises about 12% $SiO_2$ and about 0.039 mol of NaOH per mol of $SiO_2$. The aquasol is then immediately cooled to 25° C. as described above.

Two hundred and ten parts of acid reacting ethanol-aquasol as given above and 105 parts of water are then added to the colloidal solution in the still and 332 parts of ethanol and water (C. B. M.) are stripped off by distillation. The final product is cooled and drawn from the still. The aquasol so obtained has an $SiO_2$ content of about 15% and contains about 0.03 mol of NaOH per mol of $SiO_2$.

*Example II*

An acid reacting acetone-aquasol is prepared in the same manner as the ethanol-aquasol of Example I except that 747 parts of substantially anhydrous acetone are substituted for 747 parts of 190 proof ethanol. The resulting sol has a pH of about 2.6, and contains approximately 8.6% $SiO_2$, 0.5% $H_2SO_4$ and 0.1% $Na_2SO_4$.

A very stable, concentrated aquasol is prepared from the acid reacting acetone-aquasol as prepared above in the same manner and using the same quantities of ingredients in the addition steps as described in Example I except that the acetone-aquasol is used instead of the ethanol-aquasol. The procedure is the same as in Example I as described above except that the amount of distillate required to be removed in order to effect a substantially complete removal of acetone in each step is somewhat less. Thus, the colloidal solutions obtained between addition steps and after the final addition step contain lower concentrations of $SiO_2$ than those obtained in Example I. The colloidal solution so obtained is further concentrated to a 15% $SiO_2$ sol having a pH of about 9.2 by removing the necessary amount of water by distillation.

*Example III*

A stable aquasol is prepared as described in Example II except that substantially all acetone is removed from the aqueous solution by countercurrent extraction with toluene in a packed tower in every instance where the distillation procedure had been used in the previous examples, the aquasol so obtained is then concentrated to a 15% silica aquasol by distilling off the necessary quantity of water.

Aquasols prepared as shown in the foregoing examples are stable up to 12 months or longer and may be further concentrated by the removal of water so as to contain up to 25% or more of $SiO_2$. Moreover, they contain small quantities of alkaline compound per mol of silica, that is from 0.015 to 0.040 mol of alkaline compound per mol of silica and thus have a pH within the range of 8.0 to 9.6.

Aquasols prepared in accordance with the invention have a wide variety of applications as, for example, in imparting to textiles and paper a slip resistant finish, as agents for improving the strength of cotton yarns, paper and the like.

What is claimed is:

1. The method of preparing a stable aquasol containing silica which comprises admixing in suitable proportions an acid reacting organo-aquasol having a pH of from 2.0 to 4.0 and containing up to 10% silica and an alkaline solution comprising about 0.025 mol to 0.15 mol of alkaline compound per liter of solution so as to form a colloidal solution having a pH above 9.0, removing substantially all organic diluent from said colloidal solution, then adding to said colloidal solution suitable additional quantities of said acid reacting sol and water in a plurality of addition steps so as to form a colloidal solution having a pH above 8.0 and removing substantially all organic diluent between each of said addition steps and after the last addition step.

2. The method of preparing a stable aquasol containing silica which comprises admixing in suitable proportions an acid reacting organo-aquasol having a pH of from 2.0 to 4.0 and containing up to 10% silica and an alkaline solution comprising about 0.025 mol to 0.15 mol of alkaline compound per liter of solution so as to form a colloidal solution having a pH above 9.0, removing substantially all organic diluent from said colloidal solution by distillation, then adding to said colloidal solution suitable additional quantities of said acid reacting sol and water in a plurality of addition steps so as to form a colloidal solution having a pH above 8.0 and removing substantially all organic diluent between each of said addition steps and after the last addition step by distillation.

3. The method of preparing a stable aquasol containing silica which comprises admixing in suitable proportions an acid reacting ethanol-aquasol containing up to 10% silica and having a pH of from 2.0 to 4.0 and an alkaline solution comprising about 0.025 mol to 0.15 mol of alkaline compound per liter of solution so as to form a colloidal solution having a pH above 9.0, removing substantially all of the ethanol from said colloidal solution, then adding to said colloidal solution suitable additional quantities of said acid reacting sol and water in a plurality of addition steps so as to form a colloidal solution having a pH above 8.0 and removing substantially all of the ethanol between each of said addition steps and after the last addition step.

4. The method of preparing a stable aquasol containing silica which comprises admixing in suitable proportions an acid reacting acetone-aquasol containing up to 10% silica and having a pH of from 2.0 to 4.0 and an alkaline solution comprising about 0.025 mol to 0.15 mol of alkaline compound per liter of solution so as to form a colloidal solution having a pH above 9.0, removing substantially all of the acetone from said colloidal solution, then adding to said colloidal solution suitable additional quantities of said acid reacting sol and water in a plurality of addition steps so as to form a colloidal solution having a pH of above 8.0 and removing substantially all of the acetone between each of said addition steps and after the last addition step.

5. The method of preparing a stable aquasol containing silica which comprises admixing in suitable proportions an acid reacting 2-propanol-aquasol containing up to 10% silica and having a pH of from 2.0 to 4.0 and an alkaline solution comprising about 0.025 mol to 0.15 mol of alkaline compound per liter of solution so as to form a colloidal solution having a pH above 9.0, removing substantially all of the 2-propanol from said colloidal solution, then adding to said colloidal solution suitable additional quantities of said acid reacting sol and water in a plurality of addition steps so as to form a colloidal solution having a pH above 8.0 and removing substantially all of the 2-propanol between each of said addition steps and after the last addition step.

6. The method of preparing a stable aquasol containing silica which comprises admixing an acid reacting organo-aquasol containing silica and a sufficient quantity of dilute alkaline solution comprising about 0.025 to 0.15 mol of alkaline compound per liter of solution to provide an alkaline reacting mixture, removing substantially all organic diluent from the resulting mixture, then adding to said mixture additional quantities of said acid reacting sol in a plurality of addition steps and removing substantially all organic diluent between each of said addition steps and after the last addition step, the total quantity of acid reacting sol added being insufficient to neutralize said alkaline solution.

7. The method of preparing a stable aquasol containing silica which comprises admixing an acid reacting organo-aquasol having a pH of from 2.0 to 4.0 and containing silica and a sufficient quantity of dilute alkaline solution comprising about 0.025 to 0.15 mol of an alkaline compound per liter of solution to provide a colloidal solution having a pH above 9.0, removing substantially all organic diluent from said colloidal solution, then adding to said colloidal solution additional quantities of said acid reacting sol in a plurality of addition steps, the total quantity of acid reacting sol added being insufficient to lower the pH of said solution below 8.0, and removing substantially all organic diluent between each of said addition steps and after the last addition step.

8. A method substantially according to claim 1, but further characterized in that the alkaline compound is NaOH.

9. A method substantially according to claim 2, but further characterized in that the alkaline compound is NaOH.

10. A method substantially according to claim 3, but further characterized in that the alkaline compound is NaOH.

11. A method substantially according to claim 4, but further characterized in that the alkaline compound is NaOH.

12. A method substantially according to claim 5, but further characterized in that the alkaline compound is NaOH.

13. A method substantially according to claim 7, but further characterized in that the alkaline compound is NaOH.

MORRIS D. MARSHALL.

REFERENCES CITED

The following references are of record in the file of this patent:

UNITED STATES PATENTS

| Number | Name | Date |
|---|---|---|
| 2,285,449 | Marshall | June 9, 1942 |
| 2,285,477 | White | June 9, 1942 |
| 2,377,842 | Marshall | June 5, 1945 |
| 2,386,247 | Marshall | Oct. 9, 1945 |
| 2,391,253 | Marshall | Dec. 18, 1945 |
| 2,391,255 | Marshall | Dec. 18, 1945 |